US012551493B2

(12) United States Patent
Na et al.

(10) Patent No.: US 12,551,493 B2
(45) Date of Patent: Feb. 17, 2026

(54) COMPOSITION FOR ENHANCING THERAPEUTIC EFFECT OF STEM CELL, COMPRISING IMMUNOSUPPRESSANT, AND METHOD FOR ENHANCING THERAPEUTIC EFFECT OF STEM CELL USING SAME

(71) Applicant: SAMSUNG LIFE PUBLIC WELFARE FOUNDATION, Seoul (KR)

(72) Inventors: Duk Lyul Na, Seoul (KR); Jong Wook Chang, Seoul (KR); Na Kyung Lee, Gyeonggi-do (KR); Jung Won Hwang, Seoul (KR); Su Hyeon Myeong, Seoul (KR); Na Hee Lee, Gyeonggi-do (KR); Hyeong Seop Kim, Seoul (KR)

(73) Assignee: SAMSUNG LIFE PUBLIC WELFARE FOUNDATION, Seoul (KR)

( * ) Notice: Subject to any disclaimer, the term of this patent is extended or adjusted under 35 U.S.C. 154(b) by 920 days.

(21) Appl. No.: 17/771,269

(22) PCT Filed: Oct. 21, 2020

(86) PCT No.: PCT/KR2020/014439
§ 371 (c)(1),
(2) Date: Apr. 22, 2022

(87) PCT Pub. No.: WO2021/080331
PCT Pub. Date: Apr. 29, 2021

(65) Prior Publication Data
US 2022/0370478 A1 Nov. 24, 2022

(30) Foreign Application Priority Data

Oct. 25, 2019 (KR) .................. 10-2019-0133597
Oct. 19, 2020 (KR) .................. 10-2020-0135552

(51) Int. Cl.
A61K 31/573 (2006.01)
A61K 31/436 (2006.01)
A61P 37/06 (2006.01)

(52) U.S. Cl.
CPC .......... A61K 31/573 (2013.01); A61K 31/436 (2013.01); A61P 37/06 (2018.01)

(58) Field of Classification Search
CPC .. A61K 31/436; A61K 31/473; A61K 31/573; A61P 37/06; A61P 43/00
See application file for complete search history.

(56) References Cited

U.S. PATENT DOCUMENTS

2019/0183900 A1  6/2019  Kim et al.

FOREIGN PATENT DOCUMENTS

KR  10-2017-0105436 A    9/2017
WO  WO-2011072216 A2 *  6/2011  .............. A61P 37/06

OTHER PUBLICATIONS

Torres-Espín et al., J. Neurotrauma, vol. 32, pp. 367-380, publ. Mar. 15, 2015 (Year: 2015).*
International Search Report from corresponding PCT Application No. PCT/KR2020/014439, dated Feb. 19, 2021.
Le, U. N., et al.; "Bioluminescence imaging of the prolongation of cardiac stem cell survival with pharmaceutical and genetic intervention", Journal of Nuclear Medicine, May 1, 2007, vol. 48, No. 2, p. 167.
Le, U. N., et al; Bioluminescence imaging to monitor the prolongation of stem cell survival by pharmaceutical intervention, 2005 44th KSNM Autumn Conference & General Meeting, 2005, p. 320.
Wang, D., et al.; "An in vitro and in vivo study of the effect of dexamethasone on immunoinhibitory function of induced pluripotent stem cell-derived mesenchymal stem cells", Cell Transplantation, 2018, vol. 27, No. 9, pp. 1340-1351.
Michelo, C. M., et al.; "Added effects of dexamethasone and mesenchymal stem cells on early natural killer cell activation", Transplant Immunology, Apr. 30, 2016, vol. 37, pp. 1-9.
Office Action from corresponding Korean Patent Application No. 10-2020-0135552, issued Feb. 3, 2022.
Dong Jian et al., "FK506 stimulation of osteogenic activity in rat mesenchymal stem cells in vitro", Chinese Journal of Trauma, 2006, vol. 22, No. 10, pp. 775-778.
Office Action from corresponding Korean Patent Application No. 10-2020-0135552, dated Jun. 2, 2022.
Prockop, D. J., et al.; "Data against a Common Assumption: Xenogenic Mouse Models Can Be Used to Assay Suppression of Immunity by Human MSCs", Molecular Therapy, vol. 25, No. 8, Aug. 2017, pp. 1748-1756.
Antonios, J. P., et al.; "Immunosuppressive mechanisms for stem cell transplant survival in spinal cord injury" Neurosurgical Focus, 46, 3, E9, 2019, pp. 1-8.

* cited by examiner

Primary Examiner — Sarah Pihonak
(74) Attorney, Agent, or Firm — Harness, Dickey & Pierce, P.L.C.

(57) ABSTRACT

The present invention relates to a composition for enhancing a survival rate of stem cells, including an immunosuppressant, and to a use thereof. According to the present invention, a survival rate of stem cells can be remarkably enhanced using a composition including an immunosuppressant, and a therapeutic effect of stem cells can be improved on the basis of the enhancement. The composition can overcome an immune response caused by the administration of xenogeneic cells so as to accurately verify the stability and efficacy of cells, and thus will be able to be utilized as a mesenchymal stem cell therapeutic agent that maximizes a therapeutic effect of stem cells.

3 Claims, 16 Drawing Sheets

MEM / hMSC Injection ↓

| | Day -1 | Day 0 | Day 1 | Day 2 | Day 3 | Day 4 | Day 5 | Day 6 | Day 7 |
|---|---|---|---|---|---|---|---|---|---|
| MEMα1x | - | - | - | - | - | - | - | - | - |
| hMSC only | - | - | - | - | - | - | - | - | - |
| hMSC + Dexa | ● | ● | - | - | - | - | - | - | - |
| hMSC + Tac | ■ | ■ | ■ | ■ | ■ | ■ | ■ | ■ | ■ |
| hMSC + Dexa + Tac | D ● / T ■ | D ● / T ■ | T | T | T | T | T | T | T |

Dexamethasone (D; Dexa): 1 mg/kg, P.O. (Oral administration)

Tacrolimus (T; Tac): 3 mg/kg, I.P. (Intraperitoneal administration)

FIG. 3

COMPOSITION FOR ENHANCING THERAPEUTIC EFFECT OF STEM CELL, COMPRISING IMMUNOSUPPRESSANT, AND METHOD FOR ENHANCING THERAPEUTIC EFFECT OF STEM CELL USING SAME

CROSS-REFERENCE TO RELATED APPLICATIONS

This application is a national phase application of PCT Application No. PCT/KR2020/014439, filed on 21 Oct. 2020, which claims benefit of Korean Patent Application Nos. 10-2019-0133597, filed on 25 Oct. 2019 and 10-2020-0135552, filed on 19 Oct. 2020. The entire disclosure of the applications identified in this paragraph are incorporated herein by references.

TECHNICAL FIELD

The present invention relates a composition for enhancing a survival rate of stem cells, including an immunosuppressant, and to a method for enhancing a therapeutic effect of stem cells using the same.

BACKGROUND ART

Stem cells refer to cells with the ability to differentiate into two or more cells while having a self-replication ability. Such stem cells may be classified into totipotent stem cells, pluripotent stem cells and multipotent stem cells according to their ability to differentiate, and the multipotent stem cells refer to stem cells capable of differentiating into cells specific to the tissue or organ containing these cells.

Mesenchymal stem cells (MSCs) are stem cells present in cartilage, bone tissue, adipose tissue, bone marrow matrix (stroma), and the like, are known to be capable of improving a microenvironment by secreting various proteins to the outside (paracrine effect) and known as cells involved in tissue regeneration, treatment and immune responses along with multipotency, and therefore, efforts to develop therapeutic agents for various diseases by isolating and culturing mesenchymal stem cells from cord blood, bone marrow, and the like using these characteristics have been steadily continuing.

In particular, a study that mesenchymal stem cells have almost no immune rejection response, unlike other stem cells, had been actively conducted, but recently, studies on the immunogenicity of mesenchymal stem cells have been published, so there is a need for a method capable of improving a therapeutic effect which can reduce the immune response of mesenchymal stem cells and increase the survival rate of mesenchymal stem cells.

Although studies have been attempted to show the immunosuppressive effects of using mesenchymal stem cells and an immunosuppressant in combination (Transplant Immunology 37 (2016) 1-9), there are insufficient studies on a composition for enhancing a survival rate of stem cells including an immunosuppressant.

SUMMARY

Technical Problem

As a result of intensive studies on a method for improving a therapeutic effect capable of reducing the immune response of stem cells and the survival rate of stem cells, the present inventors confirmed that the therapeutic effect of stem cells was remarkably improved by finding that the survival rate of stem cells is enhanced when the stem cells are treated with tacrolimus or dexamethasone which is known as an immunosuppressant in the related art, thereby completing the present invention.

Thus, an object of the present invention is to provide a composition for enhancing a survival rate of stem cells, including an immunosuppressant.

Further, another object of the present invention is to provide a stem cell therapeutic adjuvant including the composition for enhancing a survival rate of stem cells.

In addition, still another object of the present invention is to provide a method for enhancing a survival rate of stem cells and reducing an immune response of stem cells, the method including administering an immunosuppressant to a mammal other than a human.

However, the technical problem to be achieved by the present invention is not limited to the aforementioned problem, and other problems that are not mentioned may be clearly understood by a person skilled in the art from the following description.

Technical Solution

To achieve the objects of the present invention as described above, the present invention provides a composition for enhancing a survival rate of stem cells, including an immunosuppressant.

As an exemplary embodiment of the present invention, the immunosuppressant may be tacrolimus or dexamethasone.

As another exemplary embodiment of the present invention, the tacrolimus may be intraperitoneally administered at a concentration of 1 to 10 mg/kg.

As still another exemplary embodiment of the present invention, the dexamethasone may be orally administered at a concentration of 0.5 to 3 mg/kg.

As yet another exemplary embodiment of the present invention, the composition may reduce an immune response caused by the stem cells.

As yet another exemplary embodiment of the present invention, the stem cells may be embryonic stem cells or adult stem cells.

As another exemplary embodiment of the present invention, the adult stem cells may be mesenchymal stem cells derived from one or more tissues selected from the group consisting of the umbilical cord, cord blood, bone marrow, fat, muscle, nerve, skin, the amnion, and the placenta.

Further, the present invention provides a stem cell therapeutic adjuvant including the composition for enhancing a survival rate of stem cells.

In addition, the present invention provides a method for enhancing a survival rate of stem cells and reducing an immune response of stem cells, the method including administering an immunosuppressant to a mammal other than a human.

As an exemplary embodiment of the present invention, the immunosuppressant may be tacrolimus or dexamethasone.

As another exemplary embodiment of the present invention, the tacrolimus may be intraperitoneally administered at a concentration of 1 to 10 mg/kg.

As still another exemplary embodiment of the present invention, the dexamethasone may be orally administered at a concentration of 0.5 to 3 mg/kg.

As yet another exemplary embodiment of the present invention, the immunosuppressant may be administered orally, intraperitoneally, intravenously, intramuscularly or subcutaneously.

Furthermore, the present invention provides a use of the composition for enhancing a survival rate of stem cells.

Advantageous Effects

The present inventors confirmed that an immune response occurs in mice administered human mesenchymal stem cells (hMSCs), and experimentally confirmed that, by treating the mice with an immunosuppressant, a therapeutic effect of stem cells is remarkably improved, such as a reduction in immune response and enhancement of a survival rate of stem cells.

Therefore, according to the present invention, a survival rate of stem cells can be remarkably enhanced using a composition including an immunosuppressant, and a therapeutic effect of stem cells can be improved on the basis of the enhancement. The composition can overcome an immune response caused by the administration of xenogeneic cells so as to accurately verify the stability and efficacy of cells, and thus will be able to be utilized as a mesenchymal stem cell therapeutic agent that maximizes a therapeutic effect of stem cells.

BRIEF DESCRIPTION OF THE DRAWINGS

FIG. 3 illustrates the experimental conditions for administration of an immunosuppressant used in combination with hMSC transplantation.

DETAILED DESCRIPTION

Figure 1:
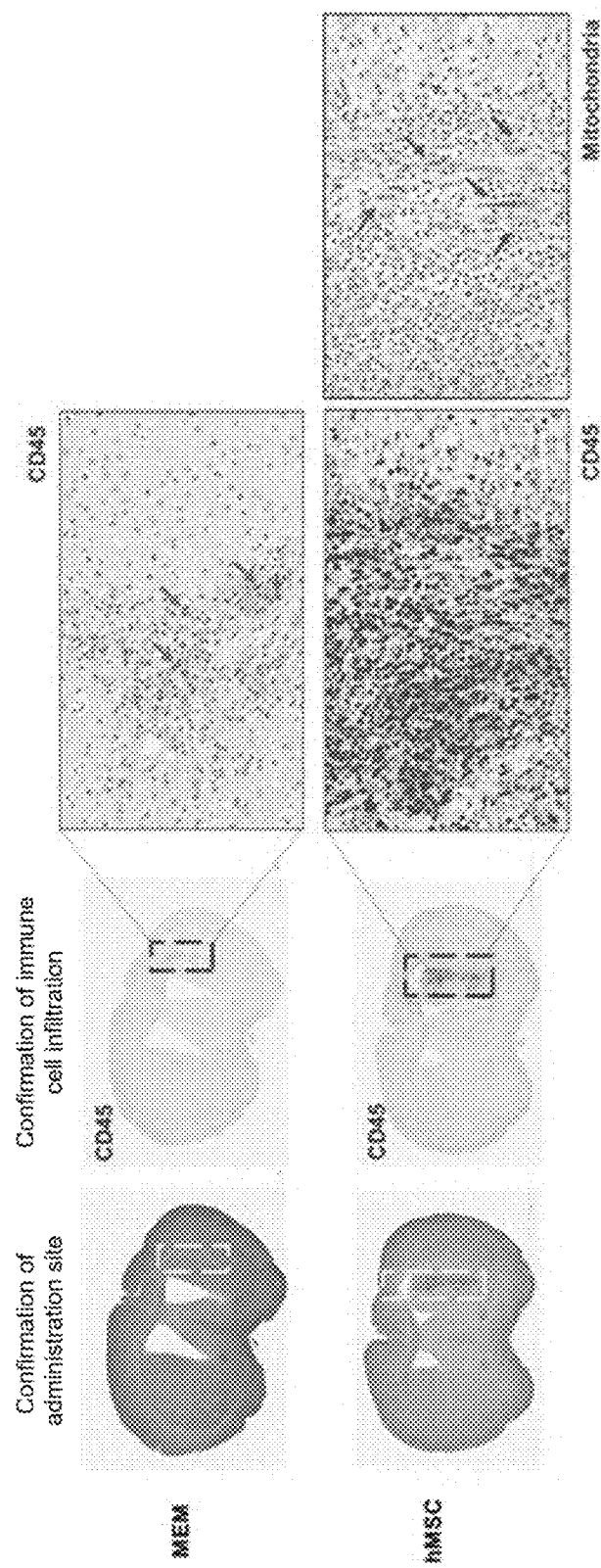
FIG. 1 illustrates the results of confirming that immune cell infiltration occurs when hMSCs are administered to normal mouse brain parenchyma by immunohistochemical staining (IHC).

The present inventors confirmed that an immune response occurs in mice administered human mesenchymal stem cells (hMSCs), and experimentally confirmed that by treating the mice with an immunosuppressant, a therapeutic effect of stem cells is remarkably improved, such as a reduction in immune response and enhancement of a survival rate of stem cells, thereby completing the present invention based on this.

Thus, the present invention provides a composition for enhancing a survival rate of stem cells, including an immunosuppressant.

As used herein, the term 'immunosuppressant' is a drug that reduces or suppresses the activity of the in vivo immune system, and collectively refers to a steroid agent, a cell proliferation inhibitor, an antibody preparation, an immunophilin-based drug, mycophenolate, a tumor necrosis factor (TNF-α) inhibitor, and the like.

In the present invention, the type of the immunosuppressant is not limited, specifically, a calcineurin inhibitor or a steroidal immunosuppressant is preferred, and more specifically, tacrolimus or dexamethasone is more preferred.

In the present invention, the dose of tacrolimus is not limited, but includes, preferably, intraperitoneal administration at a concentration of 1 to 10 mg/kg, and may include, more preferably, intraperitoneal administration at a concentration of 3 mg/kg.

In the present invention, the dose of dexamethasone is not limited, but includes, preferably, oral administration at a concentration of 0.5 to 3 mg/kg, and may include, more preferably, oral administration at a concentration of 1 mg/kg.

In the present invention, the composition for enhancing a survival rate of stem cells is characterized by reducing an immune response caused by stem cells.

The present inventors confirmed an effect of reducing the immune response of stem cells and the enhancement of the survival rate of stem cells according to immunosuppressant treatment through specific exemplary embodiments.

In an exemplary embodiment of the present invention, as a result of administering stem cells and an immunosuppressant to normal mice, and then performing cardiac perfusion to extract the brains and analyzing the brains by immunohistochemical staining, it was confirmed that an immune response was reduced in a group administered the immunosuppressant compared to a stem cell-alone administration group, and it was confirmed that in the group administered the immunosuppressant, the infiltration of CD45 immune cells was reduced compared to a group administered hMSCs alone (see Example 3).

In another exemplary embodiment of the present invention, as a result of administering stem cells and an immunosuppressant to normal mice, and then analyzing the harvested brains by qPCR, it was confirmed that in a group administered the immunosuppressant, the retention rate of stem cells was highly exhibited compared to the stem cell-alone administration group (see Example 4).

The above results show that through the administration of the immunosuppressant, it is possible to reduce the effective immune response of human mesenchymal stem cells and enhance the survival rate of human mesenchymal stem cells.

As used herein, the 'stem cells' refer to cells with the ability to differentiate into two or more different cells while having a self-replication ability. The stem cell of the present invention may be an autologous or allogeneic-derived stem cell, and may be derived from any type of animal including a human and a non-human mammal, and is not limited to those derived from an adult body and derived from an embryo.

In the present invention, the stem cells may be embryonic stem cells, induced pluripotent stem cells (iPSCs) or adult stem cells, and may be preferably embryonic stem cells or adult stem cells, but are not limited thereto.

In the present invention, the mesenchymal stem cells may be mesenchymal stem cells derived from the umbilical cord, cord blood, bone marrow, fat, muscle, nerve, skin, the amnion, the placenta, and the like, but are not limited thereto.

Further, the present invention provides a stem cell therapeutic adjuvant including the composition for enhancing a survival rate of stem cells.

As used herein, the 'stem cell therapeutic adjuvant' refers to a preparation capable of being used as an adjuvant in order to enhance the effect of a stem cell therapeutic agent generally used in the art, and by using the adjuvant according to the present invention, the effect of the therapeutic agent may be improved by promoting a reduction in immune response and enhancement of a survival rate of stem cells.

In addition, the present invention provides a method for enhancing a survival rate of stem cells and reducing an immune response of stem cells, the method including administering an immunosuppressant to a mammal other than a human.

In the administering of the immunosuppressant to the mammal other than the human, the immunosuppressant may be administered via any general route as long as the immunosuppressant may reach a target tissue, and the immunosuppressant may be administered orally, intraperitoneally, intravenously, intramuscularly, and subcutaneously, but the route is not limited thereto.

Furthermore, the present invention provides a use of the composition including an immunosuppressant for enhancing a survival rate of stem cells.

Hereinafter, preferred examples for helping the understanding of the present invention will be suggested. However, the following examples are provided only to understand the present invention more easily, and the contents of the present invention are not limited by the following examples.

EXAMPLES

Example 1. Confirmation of Immune Response after Administration of Xenogeneic hMSCs to Mouse Brain Parenchyma After a cell culture medium (MEM) or hMSCs were administered to normal mouse brain parenchyma, the mice were sacrificed one week later. MEM was administered instead of cells to designate a control, and the extracted mouse brains were fixed in paraformaldehyde (PFA), then sectioned and histologically stained.

As a result, as illustrated in FIG. 1, it was confirmed that most of the non-specific staining was found in the MEM-administration group, and the infiltration of leukocyte (CD45 antibody) immune cells was hardly found, but in the hMSC-administration group, the infiltration of immune cells was very high at the administration site by immunohistochemical staining (IHC). Although hMSCs engrafted at the hMSC administration site were found with a mitochondria marker, it was confirmed that the number of engrafted hMSCs was remarkably less than the number of immune cells.

Example 2. Confirmation of Xenogeneic Immune Response after Administration of Syngeneic Mouse MSCs to Mouse Brain Parenchyma In order to confirm whether an immune response significantly occurred only when human-derived, that is, xenogeneic, cells, were administered to mice, stem cells of syngeneic mice (C57BL/6) were administered to other C57BL/6 mice in the same manner as in Example 1 and confirmed.

Figure 2A:
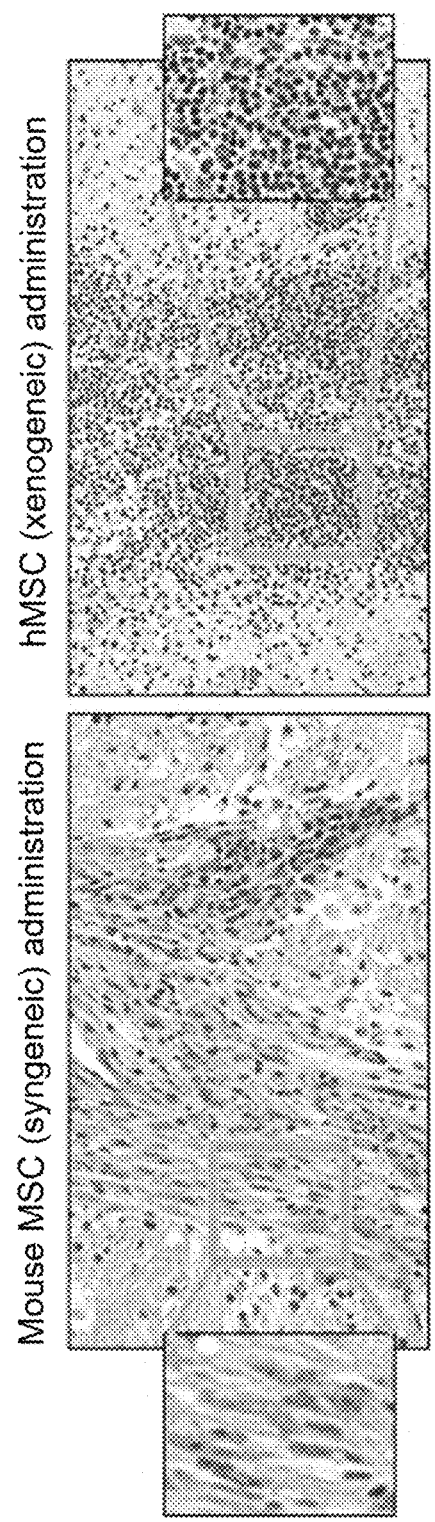
FIG. 2A illustrates the results of confirming an immune response by administering mouse MSCs and hMSCs to normal mouse brain parenchyma by Hematoxylin & Eosin (H&E) tissue staining.
Figure 2B:
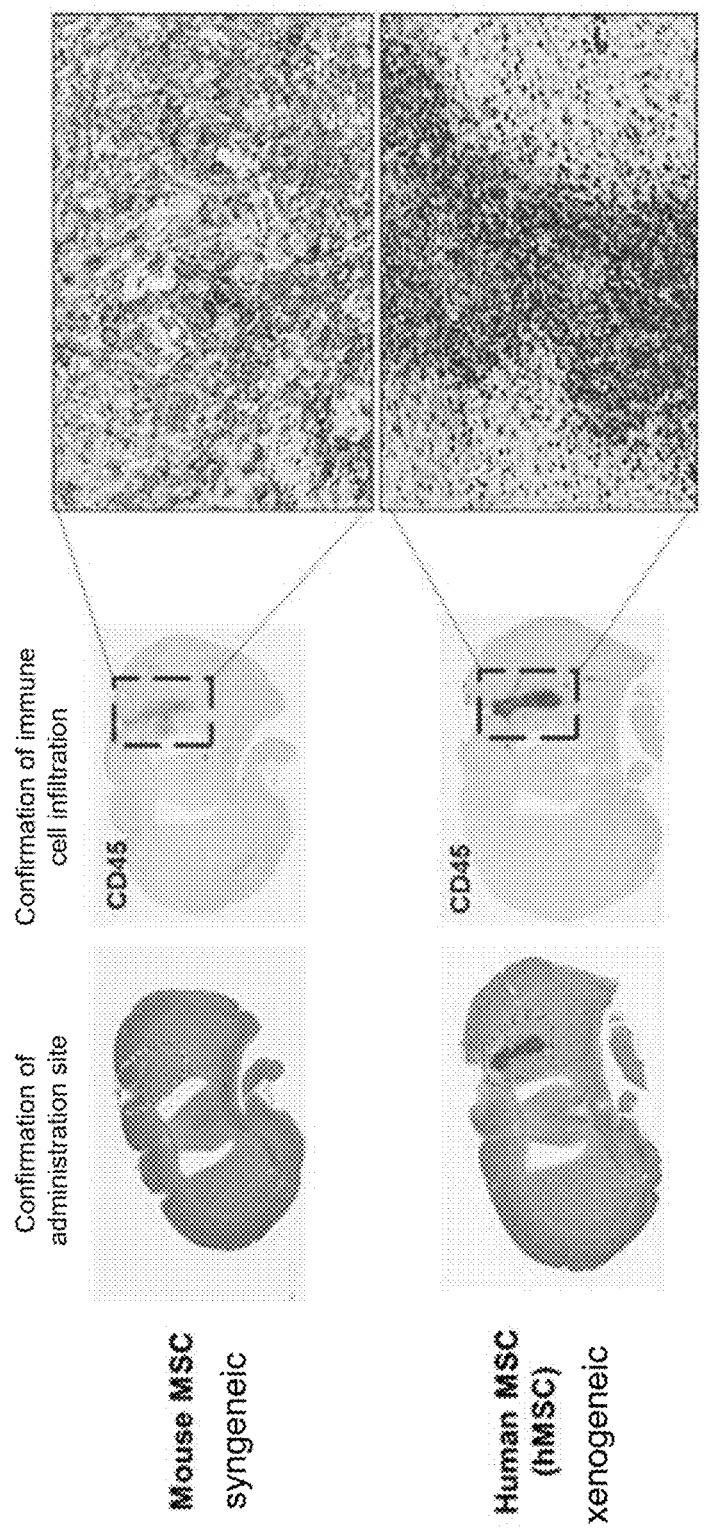
FIG. 2B illustrates the results of confirming an immune response by administering mouse MSCs and hMSCs to normal mouse brain parenchyma by immunohistochemical staining.

As a result, as illustrated in FIG. 2A, it was confirmed by Hematoxylin & Eosin (H&E) tissue staining that stem cells were successfully engrafted in the form of MSC-specific fibroblasts in a group administered mouse MSCs, and as illustrated in FIG. 2B, as a result of performing histological staining at a mouse MSC administration site and an hMSC administration site, it was confirmed that non-specific staining was found at the site where mouse MSCs were administered, and the density of immune cells expressing CD45 was increased at the site where hMSCs were administered.

From the results, it was confirmed that when xenogeneic MSCs were administered instead of syngeneic MSCs, an immune response was increased, and that the MSCs showed immunogenicity rather than immune evasion.

Example 3. Confirmation of Reduction in Mesenchymal Stem Cell Immune Response by Combined Administration of Immunosuppressant Experiments were performed by dividing normal mice (C57B/L6) into a total of five groups: an MEM-alone administration group, an hMSC-alone administration group, a dexamethasone administration group, a tacrolimus administration group, and a dexamethasone and tacrolimus-combined administration group. As illustrated in FIG. 3, a total of $2\times10^5$ hMSCs were suspended in 5 μL of MEM medium, and the resulting solution was administered to normal mouse brain parenchyma at an administration rate of 1 μL/min at coordinates A/P −0.5 mm, M/L −1.7 mm, and D/V −3.3 mm. Dexamethasone was orally administered at a dose of 1 mg/kg on the day before cell administration and on the day of cell administration, and tacrolimus was intraperitoneally administered at a dose of 3 mg/kg daily from the day before cell administration up to 7 days following cell administration. On day 7 after administration of MEM or hMSCs, the brain was extracted by performing cardiac perfusion, and then fixed in PFA, and histological staining was performed by sectioning tissue.

Figure 4A:
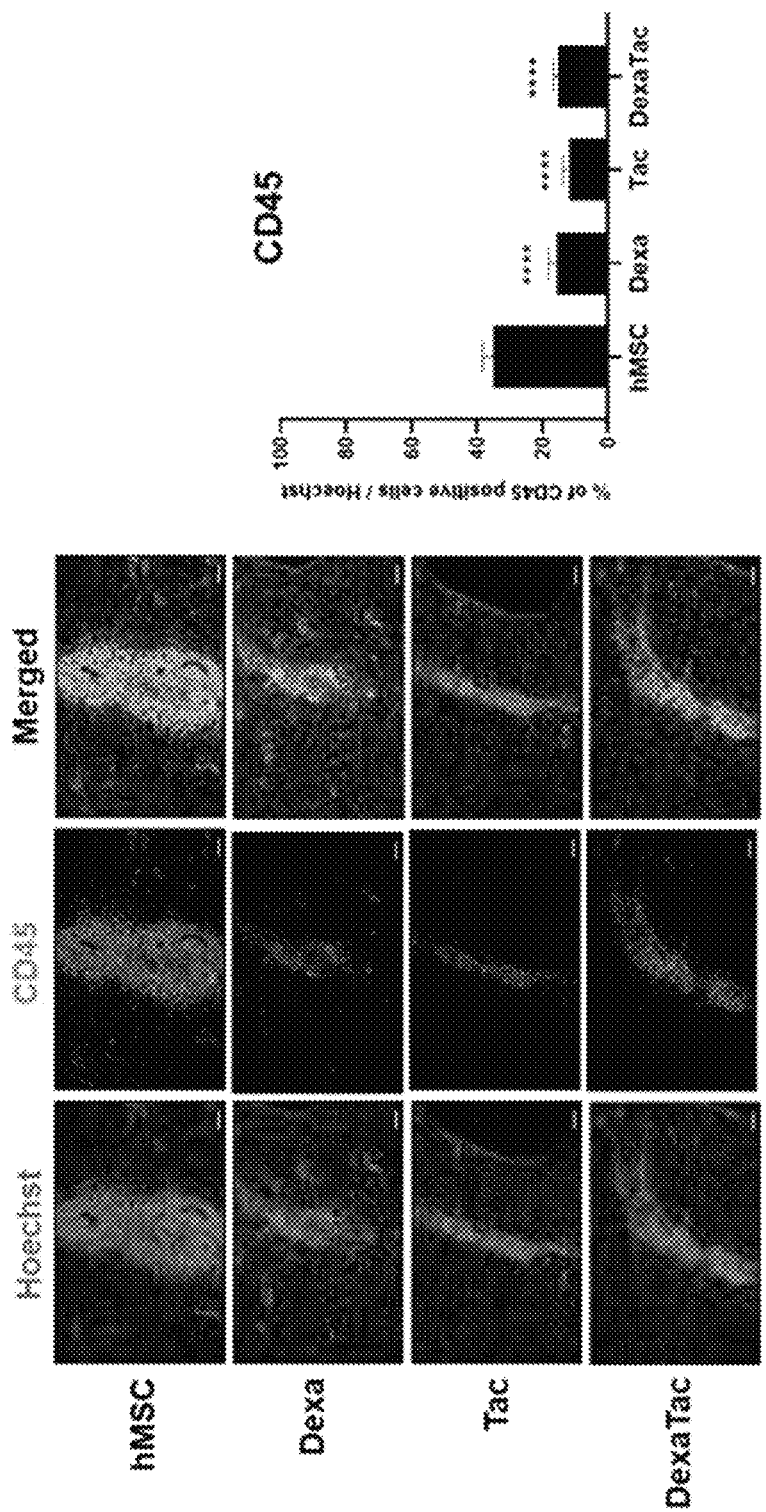
FIG. 4A illustrates the results of confirming the difference in the expression of CD45 leukocytes by immunohistochemical staining (IHC).
Figure 4B:
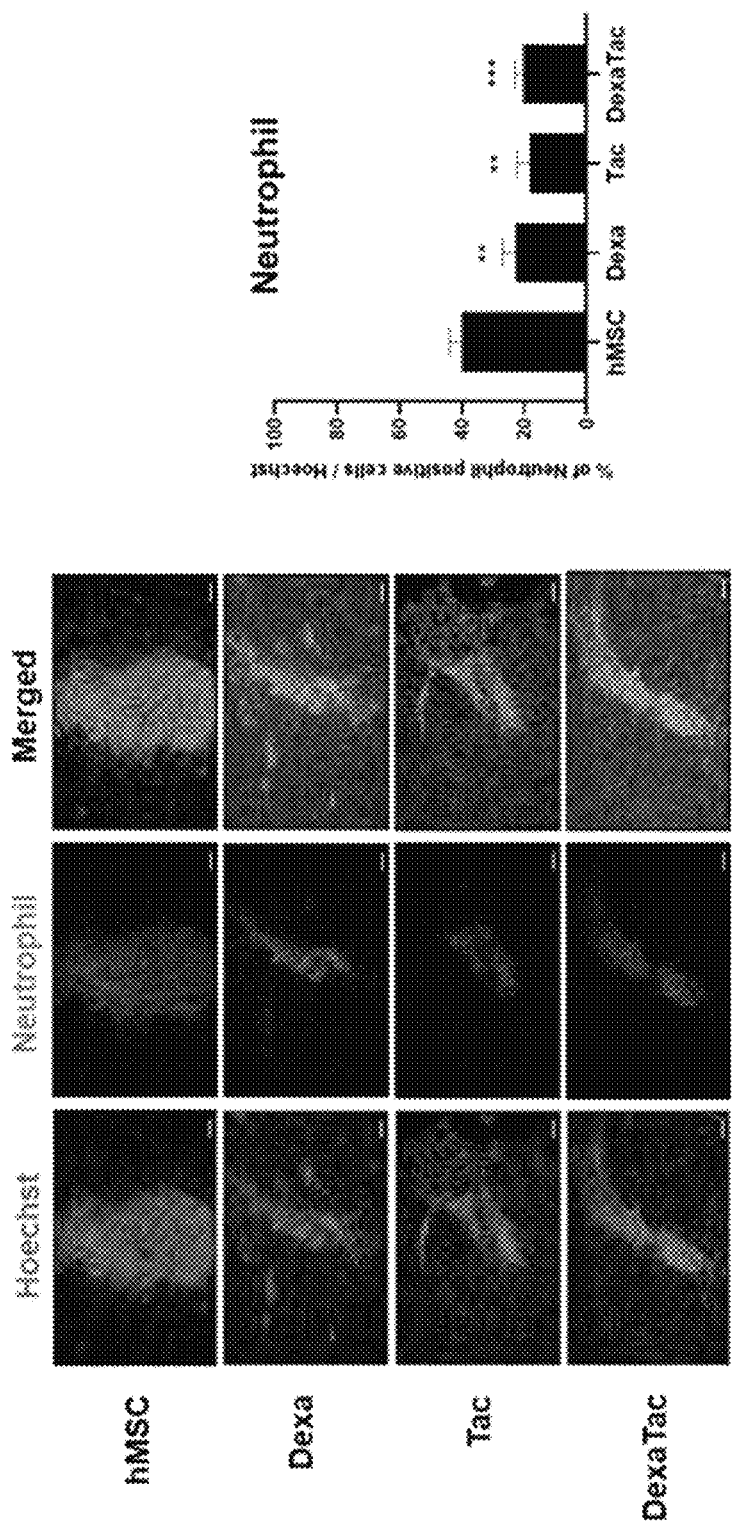
FIG. 4B illustrates the results of confirming the difference in the expression of neutrophils, which account for a large proportion of leukocytes, by immunohistochemical staining (IHC).

As a result, as illustrated in FIG. 4A, it was confirmed by IHC that in all groups administered the immunosuppressant, the infiltration of CD45 immune cells was reduced compared to a group to which hMSCs were administered alone. The difference was also statistically significant in all the groups compared to the hMSC group. Among several types of leukocytes, neutrophil cells are known to account for the highest proportion (40 to 75%). To confirm the CD45 results again, IHC was performed using an antibody capable of staining neutrophils. As a result, as illustrated in FIG. 4B, it was confirmed by IHC that in all groups administered the immunosuppressant, the infiltration of neutrophil immune cells was reduced compared to a group to which hMSCs were administered alone. The same expression pattern as that of CD45 was observed.

Figure 5A:
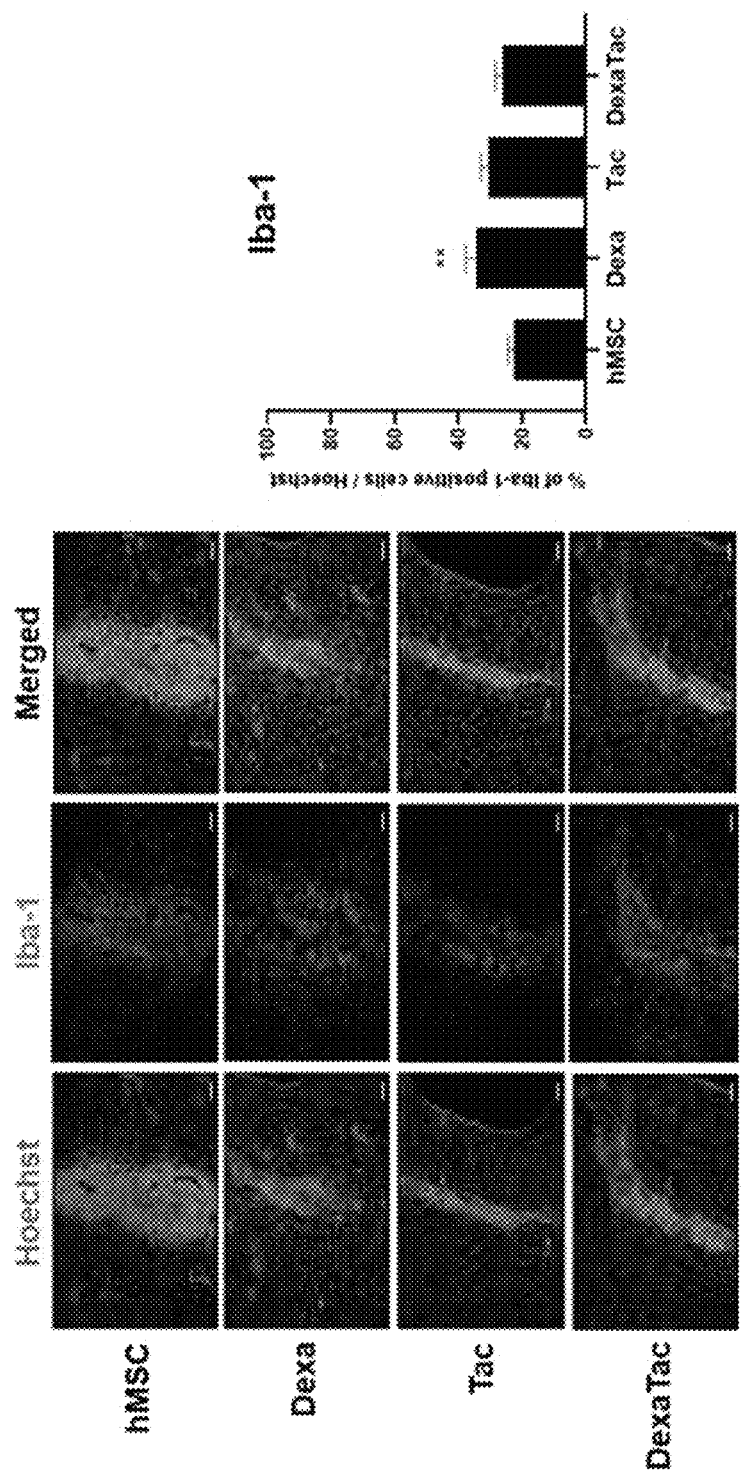
FIG. 5A illustrates the results of confirming the difference in the expression of Iba-1 microglia by immunohistochemical staining (IHC).
Figure 5B:
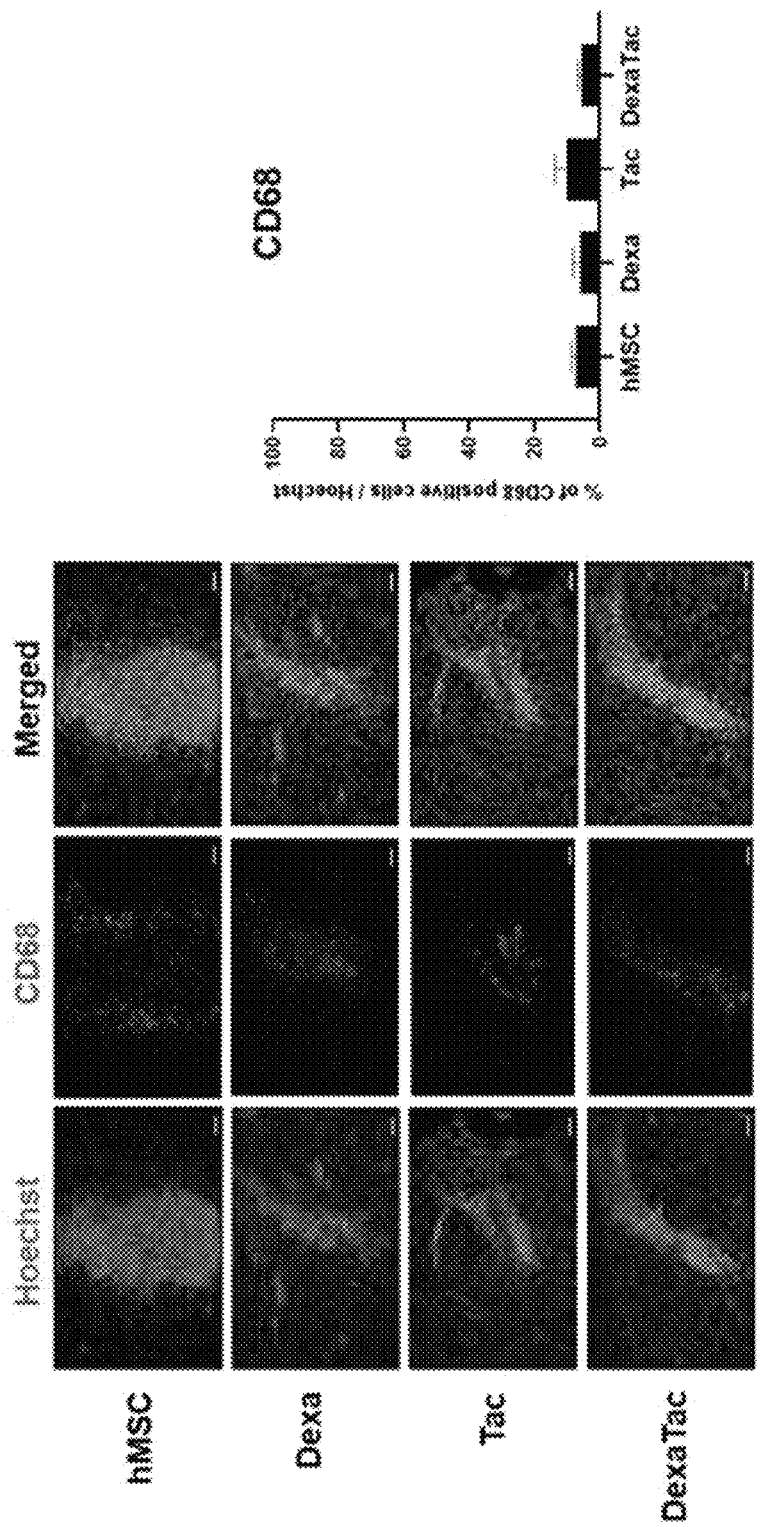
FIG. 5B illustrates the results of confirming the difference in the expression of CD68 macrophages by immunohistochemical staining (IHC).

In addition, IHC was additionally performed in order to confirm the difference in expression of inflammatory cells other than immune cells (CD45, neutrophils). An Iba-1 antibody targeting microglia and a CD68 antibody targeting macrophages, which are representative markers of inflammatory cells, were used. As a result, as illustrated in FIG. 5A, in all the groups, Iba-1 was observed to be more strongly expressed in the surrounding tissues than the site where the administered cells were aggregated, unlike CD45. The expression of Iba-1 was higher than that of the hMSC group. However, in the tacrolimus-alone administration group, and the dexamethasone and tacrolimus-combined administration group other than the dexamethasone-alone administration group, the differences were not statistically significant compared to the hMSC group. It was confirmed that the expression of CD68 was generally very low compared to the expression of CD45, neutrophils, and Iba-1. In addition, as illustrated in FIG. 5B, the difference in CD68 expression in all the groups administered the immunosuppressant was not statistically significant compared to the hMSC group.

Figure 6:
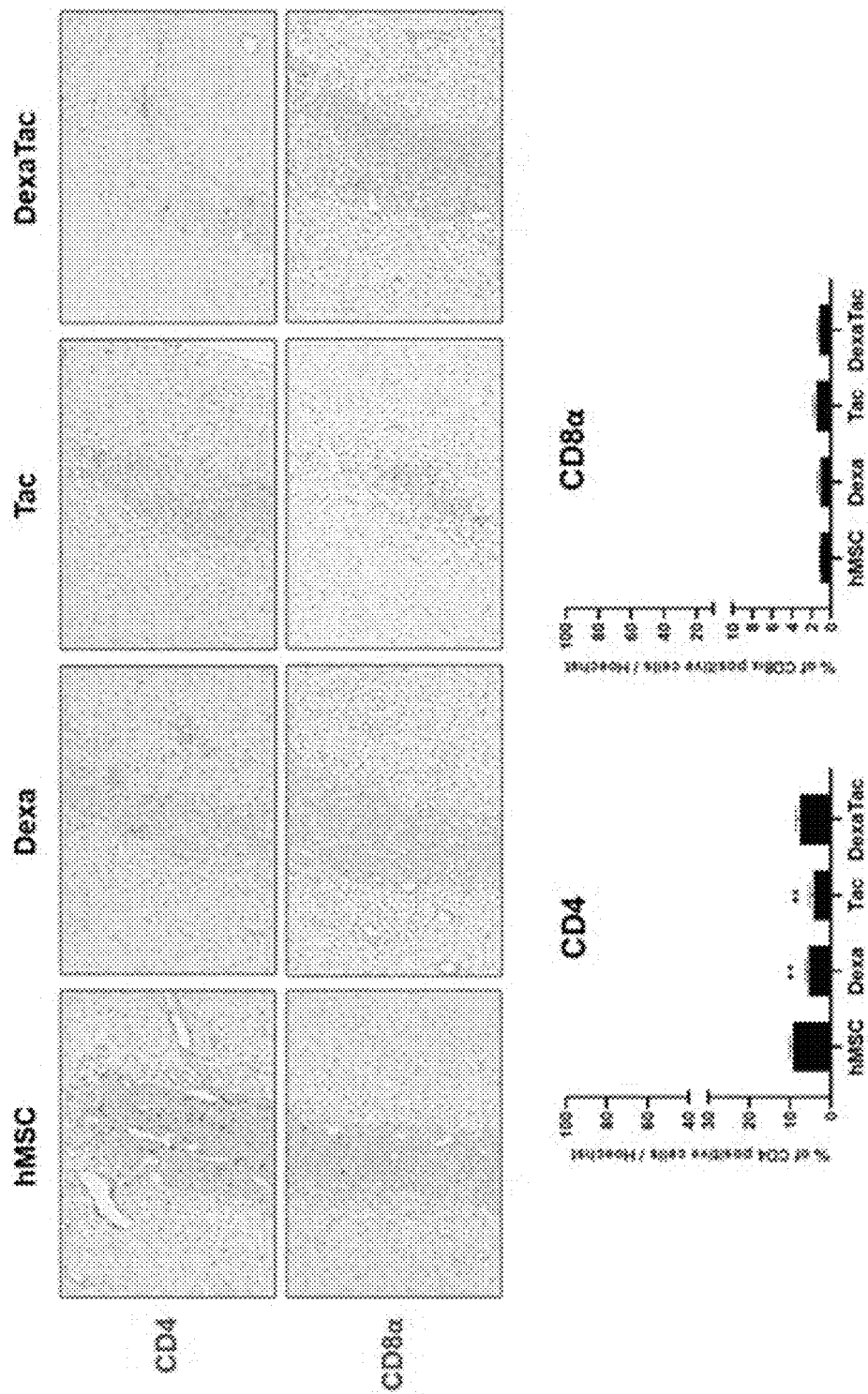
FIG. 6 confirms the changes in the distribution of T cells due to the administration of an immunosuppressant by immunohistochemical staining (IHC), and illustrates the results of confirming the difference in the expression of CD4 and CD8α T cells.

Furthermore, in order to confirm how the difference in T cell expression changed due to the administration of the immunosuppressant, IHC was performed using antibodies capable of targeting helper T cells (CD4) and cytotoxic T cells (CD8$\alpha$). As a result, as illustrated in FIG. 6, overall, the expression of CD4 and CD8$\alpha$ was very low in all the groups. It was confirmed that in the dexamethasone-alone and tacrolimus-alone administration groups, the expression of CD4 was reduced compared to the hMSC group. The difference was also statistically significant. In all the groups administered the immunosuppressant, the difference in CD8$\alpha$ Expression was not Observed Compared to the hMSC Group.

Example 4. Confirmation of Enhancement in Survival Rate of Mesenchymal Stem Cells by Combined Administration of Immunosuppressant In order to quantify the residual amount of human-derived mesenchymal stem cells (hMSCs), an experiment was performed under the same conditions as in Example 3, and then genomic DNA was isolated from an extracted mouse brain, a primer capable of binding to a human-specific ALU DNA sequence was prepared, and quantitative real time PCR (qPCR) was performed. Further, on day 7 after administration of MEM or hMSCs, to perform an additional experiment, the brain was extracted by performing cardiac perfusion, and then fixed in PFA, and histological staining was performed by sectioning tissue. IHC was also performed using a STEM121 antibody capable of specifically staining human-derived cells.

Figure 7:
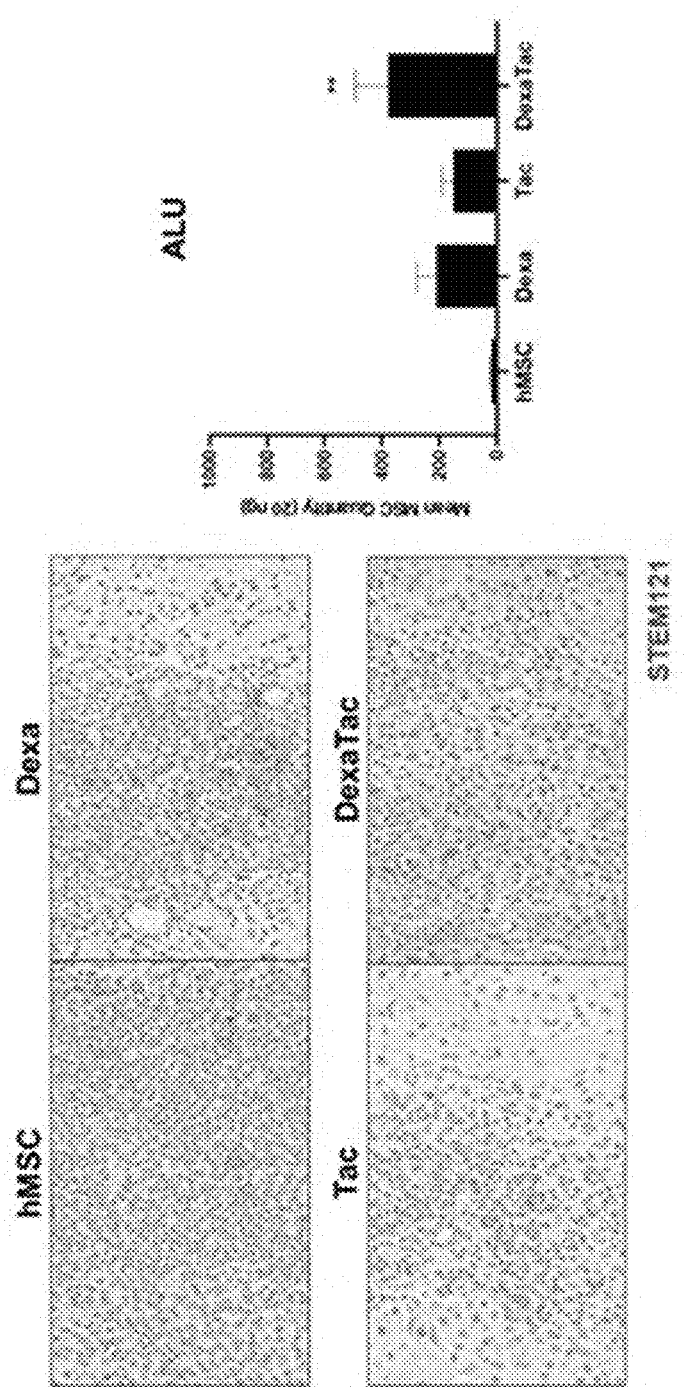
FIG. 7 illustrates the results of confirming that a survival rate of hMSCs is enhanced by the administration of an immunosuppressant by qPCR.

As a result, as illustrated in FIG. 7, it was confirmed that when an immunosuppressant was administered in combination, the retention rate of stem cells was high compared to the hMSC-alone administration group. It was confirmed that the retention rate of stem cells was highest in the dexamethasone and tacrolimus-combined administration group, followed by the dexamethasone-alone administration group. The same result was confirmed using an STEM121 marker through IHC.

Example 5. (Proof of Concept) Confirmation of Reduction in Mesenchymal Stem Cell Immune Response in Immunodeficient Mice An additional experiment was performed using immunodeficient mice to prove the concept of the present study. MEM or hMSCs were administered to normal C57BL/6 and immunodeficient BALB/c nude mice under the same conditions as in Example 3. Unlike Example 3, no immunosuppressant was administered in combination.

Figure 8A:
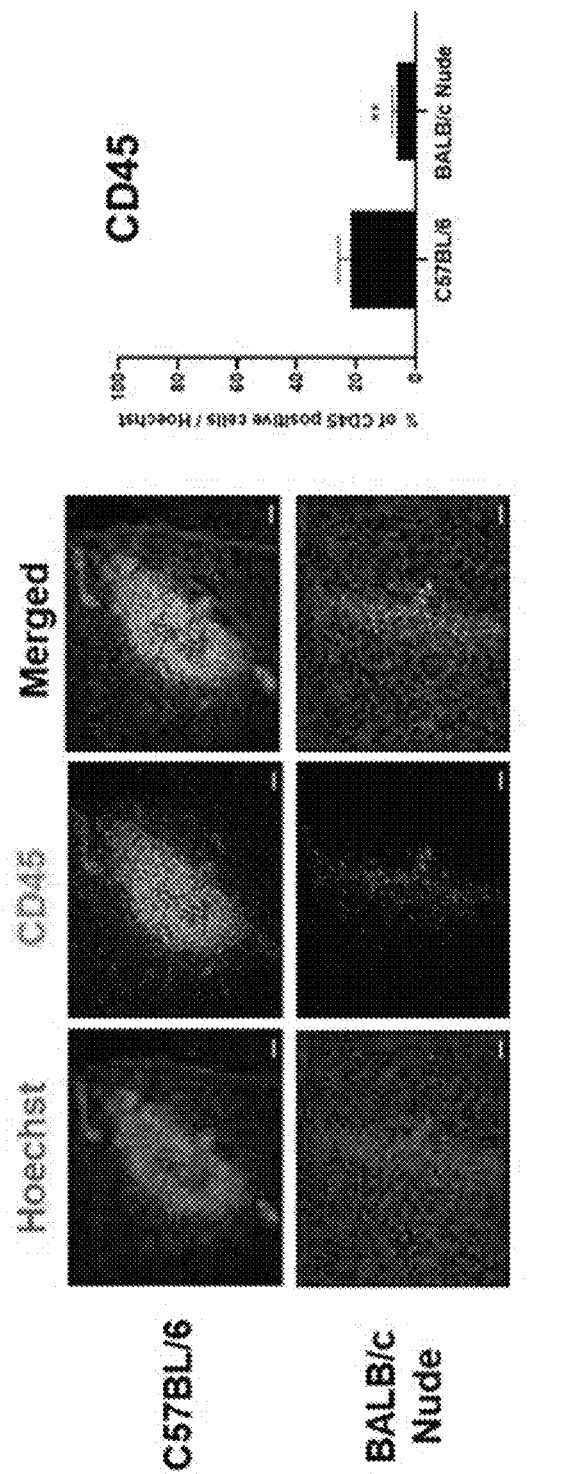
FIG. 8A illustrates the results of confirming the difference in the expression of CD45 leukocytes when hMSCs were administered to immunodeficient nude mice by immunohistochemical staining (IHC).
Figure 8B:
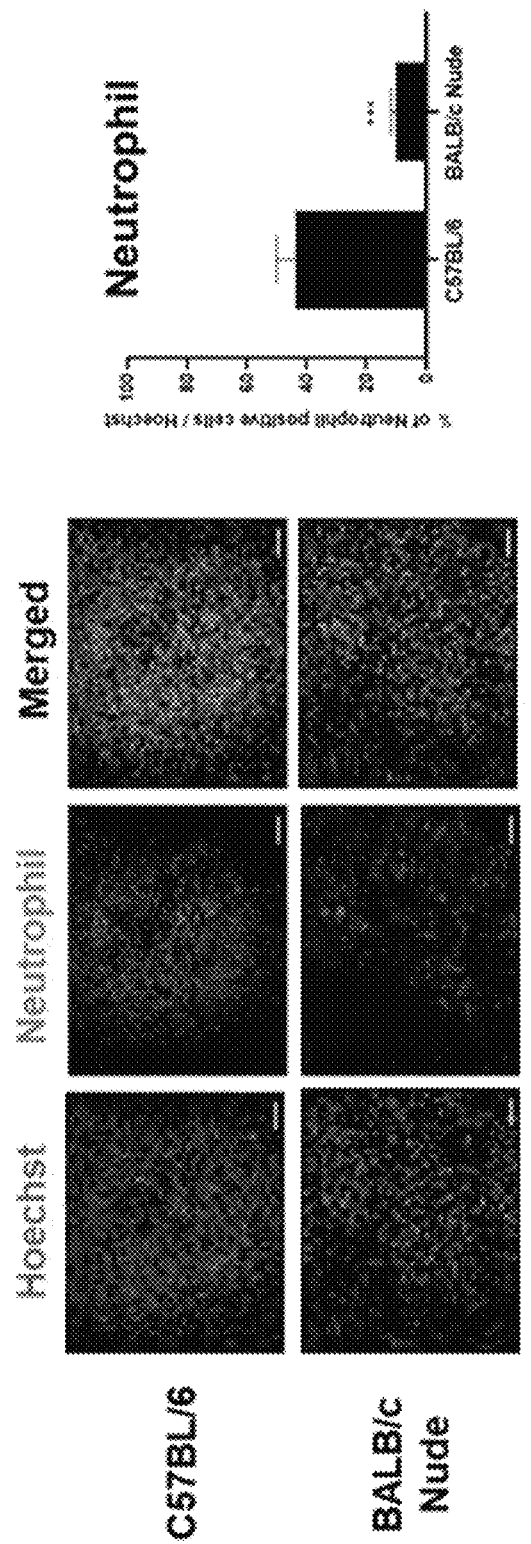
FIG. 8B illustrates the results of confirming the difference in the expression of neutrophils, which account for a large proportion of leukocytes, when hMSCs were administered to immunodeficient nude mice by immunohistochemical staining (IHC).

As a result, as illustrated in FIG. 8, it was confirmed that the expression of CD45 (FIG. 8A) and neutrophils (FIG. 8B) in immunodeficient (BALB/c nude) mice was reduced compared to normal mice (C57BL/6) at the site where hMSCs were administered. It was confirmed that this was the same result as the distribution of immune cells after co-administration of the immunosuppressant and hMSCs to normal mice.

Figure 9A:
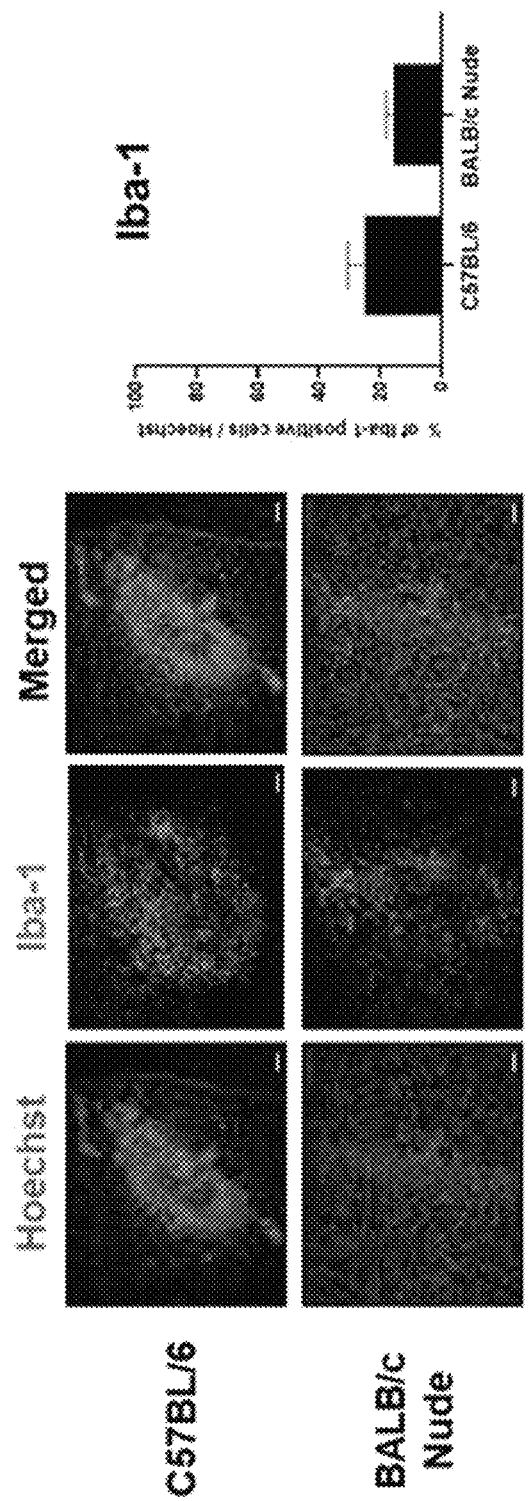
FIG. 9A illustrates the results of confirming the difference in the expression of Iba-1 microglia when hMSCs were administered to immunodeficient nude mice by immunohistochemical staining (IHC).
Figure 9B:
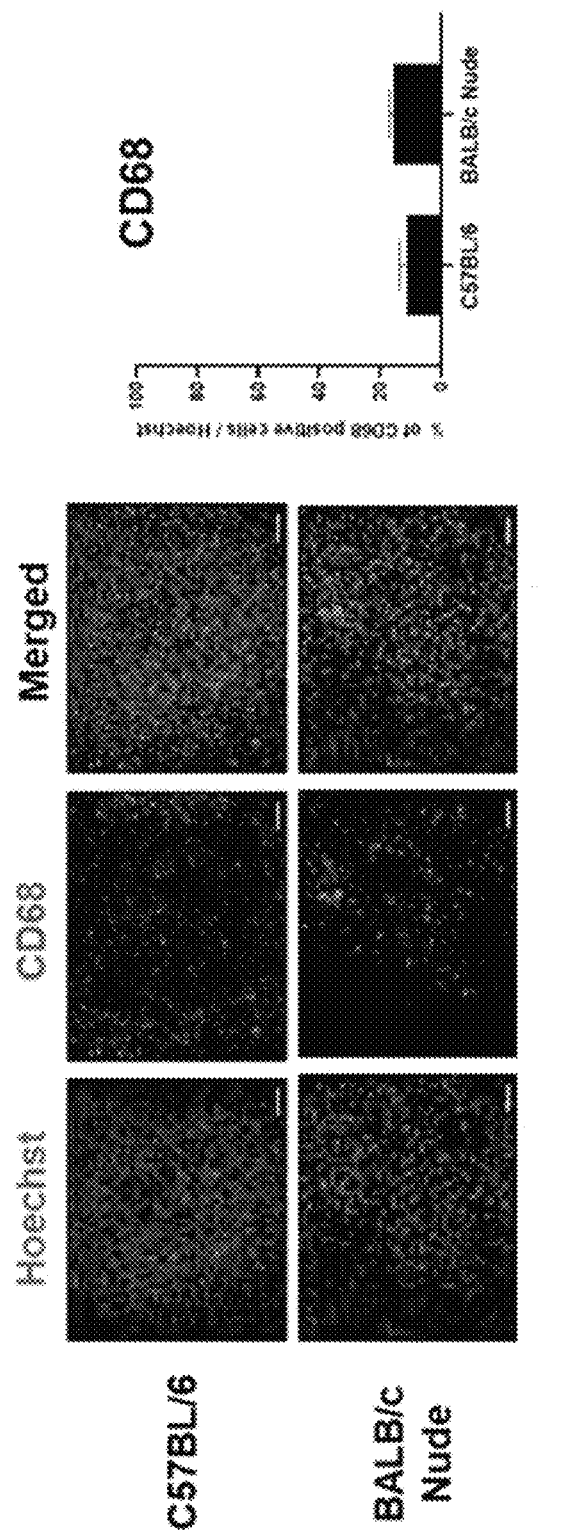
FIG. 9B illustrates the results of confirming the difference in the expression of CD68 macrophages when hMSCs were administered to immunodeficient nude mice by immunohistochemical staining (IHC).

As illustrated in FIG. 9, the difference in expression of Iba-1 and CD68 in nude mice was not statistically significant compared to normal mice.

Figure 10:
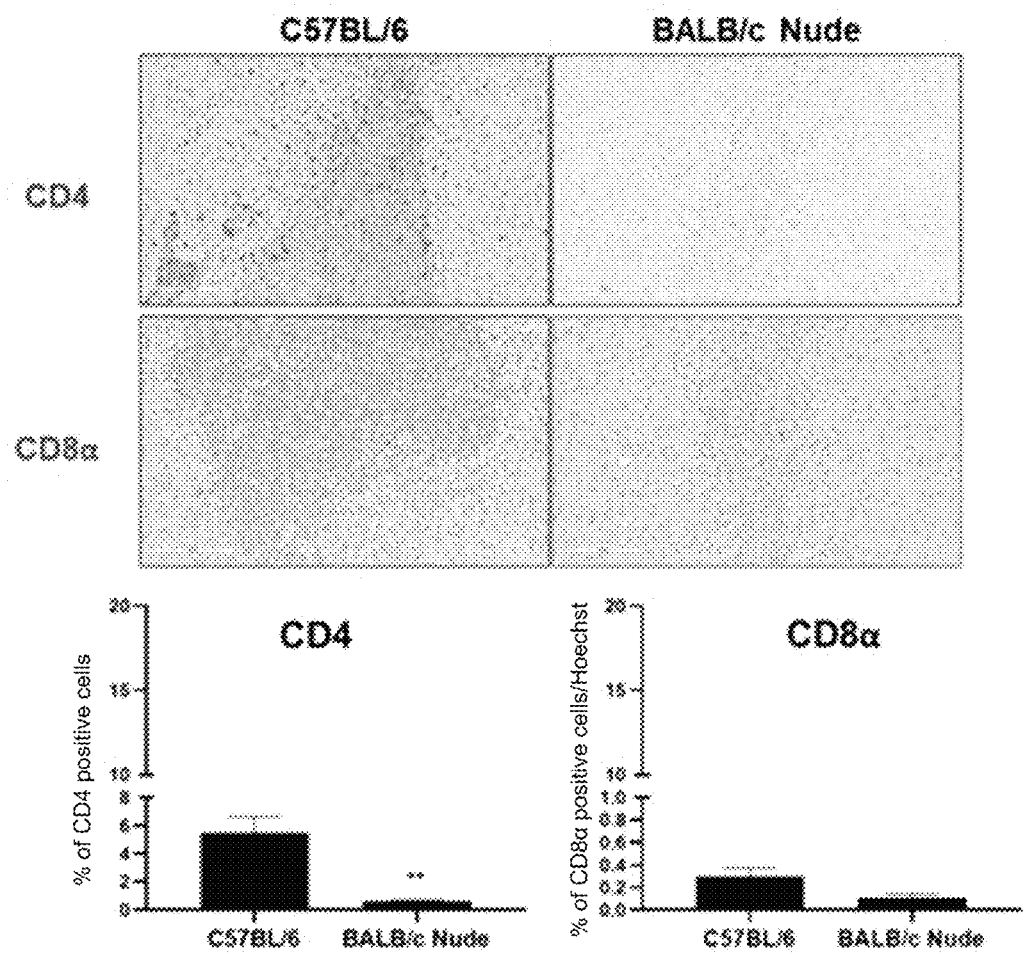
FIG. 10 confirms the changes in the distribution of T cells when hMSCs were administered to immunodeficient nude mice by immunohistochemical staining (IHC), and illustrates the results of confirming the difference in the expression of CD4 and CD8α T cells.

As illustrated in FIG. 10, it was confirmed that the expression of CD4 T cells in nude mice was sharply reduced compared to normal mice. The expression of CD8$\alpha$ T cells in nude mice appeared to be reduced compared to normal mice, but the difference was not statistically significant.

Example 6. (Proof of Concept) Confirmation of Enhancement in Survival Rate of Mesenchymal Stem Cells in Immunodeficient Mice In order to quantify the residual amount of human-derived mesenchymal stem cells (hMSCs), an experiment was performed under the same conditions as in Example 3, and then genomic DNA was isolated from an extracted mouse brain, a primer capable of binding to a human-specific ALU DNA sequence was prepared, and quantitative real time PCR (qPCR) was performed. IHC was also performed using a STEM121 antibody capable of specifically staining human-derived cells.

Figure 11:
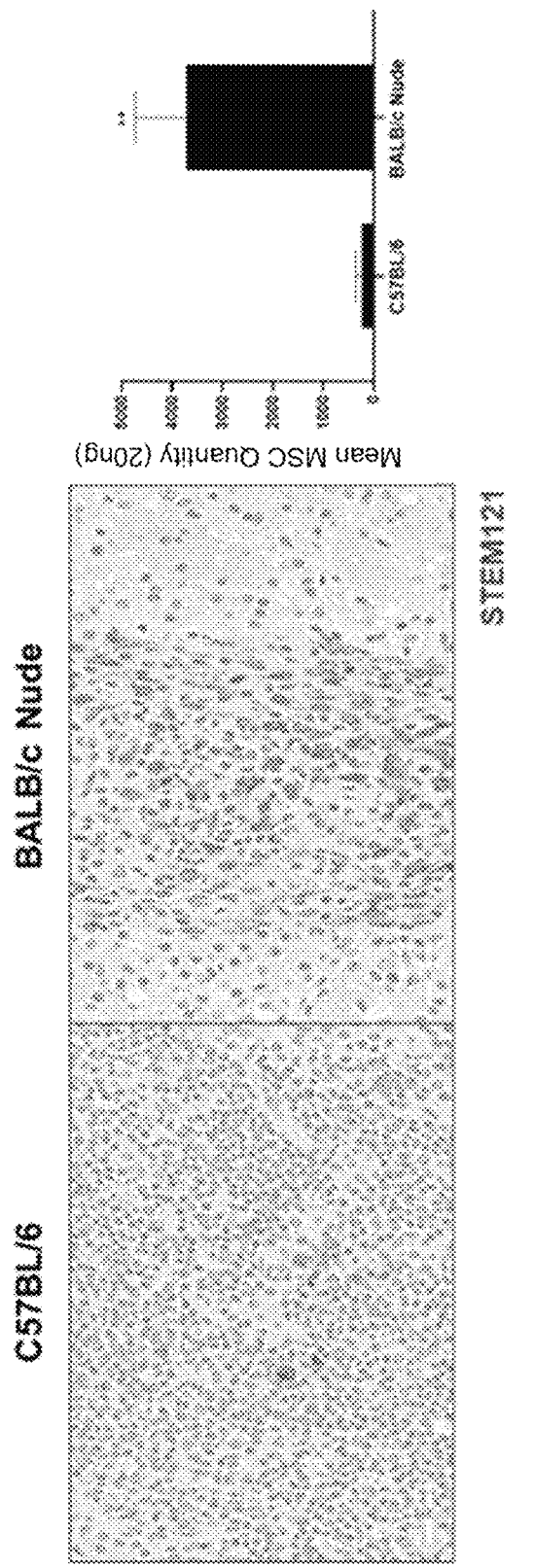
FIG. 11 illustrates the results of confirming that a survival rate of hMSCs is enhanced when hMSCs were administered to immunodeficient nude mice by qPCR.

As a result, as illustrated in FIG. 11, it was confirmed that the retention rate of stem cells in immunodeficient mice was higher than in normal mice. For IHC, it was also observed that the expression of STEM121 was higher in immunodeficient nude mice than in normal mice.

The above-described description of the present invention is provided for illustrative purposes, and those skilled in the art to which the present invention pertains will understand that the present invention can be easily modified into other specific forms without changing the technical spirit or essential features of the present invention. Therefore, it should be understood that the above-described embodiments are only exemplary in all aspects and are not restrictive.

INDUSTRIAL APPLICABILITY

The composition including an immunosuppressant according to the present invention can remarkably enhance the survival rate of stem cells, and can be usefully used as a mesenchymal stem cell therapeutic agent that maximizes a therapeutic effect of stem cells by overcoming an immune response caused by the administration of xenogeneic cells.

What is claimed is:

1. A method for enhancing a survival rate of stem cells and reducing an immune response of stem cells, the method comprising:
    administering an immunosuppressant to an individual in need thereof, and
    wherein the immunosuppressant is dexamethasone, and
    wherein the dexamethasone is orally administered at a concentration of 0.5 to 3 mg/kg.

2. The method of claim 1, wherein the immunosuppressant further comprises tacrolimus.

3. The method of claim 2, wherein the tacrolimus is intraperitoneally administered at a concentration of 1 to 10 mg/kg.

* * * * *